United States Patent
Kriese et al.

(10) Patent No.: US 8,509,398 B2
(45) Date of Patent: Aug. 13, 2013

(54) VOICE SCRATCHPAD

(75) Inventors: Jason P. Kriese, Seattle, WA (US); Scott D. Porter, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1043 days.

(21) Appl. No.: 12/417,102

(22) Filed: Apr. 2, 2009

(65) Prior Publication Data

US 2010/0254521 A1  Oct. 7, 2010

(51) Int. Cl.
*H04M 1/64* (2006.01)

(52) U.S. Cl.
USPC .................................... 379/88.11; 701/427

(58) Field of Classification Search
USPC .......... 379/88.01, 88.04, 88.08, 88.11, 88.14, 379/88.16; 704/235; 701/427
See application file for complete search history.

(56) References Cited

U.S. PATENT DOCUMENTS

| | | | |
|---|---|---|---|
| 5,742,736 A * | 4/1998 | Haddock | 704/270 |
| 6,029,063 A | 2/2000 | Parvulescu et al. | |
| 6,038,199 A * | 3/2000 | Pawlowski et al. | 369/29.02 |
| 6,222,909 B1 * | 4/2001 | Qua et al. | 379/88.22 |
| 6,385,535 B2 * | 5/2002 | Ohishi et al. | 701/427 |
| 6,427,134 B1 * | 7/2002 | Garner et al. | 704/233 |
| 6,820,055 B2 | 11/2004 | Saindon et al. | |
| 6,876,729 B1 * | 4/2005 | Kuter et al. | 379/88.22 |
| 6,993,367 B2 * | 1/2006 | Yamato et al. | 455/569.2 |
| 8,345,832 B2 * | 1/2013 | Hamaker et al. | 379/88.11 |
| 2002/0196910 A1 * | 12/2002 | Horvath et al. | 379/88.01 |
| 2004/0022137 A1 * | 2/2004 | Campbell et al. | 369/1 |
| 2006/0074623 A1 * | 4/2006 | Tankhiwale | 704/1 |
| 2006/0200742 A1 | 9/2006 | Beith et al. | |
| 2007/0111756 A1 | 5/2007 | Reed | |
| 2007/0112571 A1 | 5/2007 | Thirugnana | |
| 2008/0045198 A1 * | 2/2008 | Bhogal et al. | 455/414.4 |
| 2008/0095332 A1 | 4/2008 | Myers et al. | |
| 2008/0165791 A1 * | 7/2008 | DeGrazia | 370/412 |
| 2008/0198978 A1 | 8/2008 | Olligschlaeger | |

(Continued)

FOREIGN PATENT DOCUMENTS

EP  1727340 A1  11/2006

OTHER PUBLICATIONS

Luz, et al., "Interactive Visualisation Techniques for Dynamic Speech Transcription, Correction and Training", retrieved at <<https://www.cs.tcd.ie/Saturnino.Luz/publications/LuzMasoodianRogersCHINZ08.pdf>>, pp. 8.

(Continued)

*Primary Examiner* — Olisa Anwah
(74) *Attorney, Agent, or Firm* — Alleman Hall McCoy Russell & Tuttle LLP

(57) ABSTRACT

Various embodiments of systems and methods to implement a voice scratchpad for deriving data from a voice communication are provided. The system may include a voice scratchpad module configured to detect an audio connection between an on-board vehicle computing device and a communications device, and present a selector on a voice scratchpad graphical user interface, which upon selection by a user causes the voice scratchpad module to process voice data received via the audio connection to obtain recognized speech data. The system may further include an annotation engine configured to annotate the recognized speech data to produce structured data in one of a plurality of predetermined formats. The voice scratchpad module may be configured to receive the structured data from the annotation engine, and display the structured data on voice scratchpad graphical user interface.

20 Claims, 3 Drawing Sheets

(56) References Cited

U.S. PATENT DOCUMENTS

| | | | |
|---|---|---|---|
| 2009/0141875 A1* | 6/2009 | Demmitt et al. | 379/88.14 |
| 2009/0326939 A1* | 12/2009 | Toner et al. | 704/235 |
| 2010/0144319 A1* | 6/2010 | Bodas et al. | 455/412.1 |
| 2010/0153106 A1* | 6/2010 | Frazier et al. | 704/235 |
| 2010/0158213 A1* | 6/2010 | Mikan et al. | 379/88.14 |
| 2010/0246784 A1* | 9/2010 | Frazier et al. | 379/88.13 |
| 2010/0330975 A1* | 12/2010 | Basir | 455/418 |
| 2012/0010805 A1* | 1/2012 | Wilkerson | 701/200 |
| 2012/0135714 A1* | 5/2012 | King, II | 455/412.1 |

OTHER PUBLICATIONS

Lamel, et al., "Speech Transcription in Multiple Languages", retrieved at <<ftp://tlp.limsi.fr/public/icassp04$_{13}$II.pdf>>, IEEE, 2004, pp. 757-760.

Hain, et al., "Automatic Transcription of Conversational Telephone Speech", retrieved at <<http://citeseerx.ist.psu.edu/viewdoc/summary?doi=10.1.1.10.4695>>, Dec. 2003, pp. 23.

* cited by examiner

VOICE SCRATCHPAD

BACKGROUND

A user may want to record a portion of a conversation over a mobile phone in an environment in which writing a note by hand, or manually inputting data into an electronic device, is inconvenient or not possible. For example, a driver of a vehicle may desire to record a phone number or address discussed in a telephone conversation while driving, for future reference. In order to operate the vehicle safely, the driver may choose to commit the telephone number to memory, stop the vehicle, and write the phone number down after the vehicle is stopped. However, this may interrupt the driver's route, and can result in errors in data recall. Even small errors in an address or telephone number may render the recalled information unusable, causing delay and frustration for the driver.

SUMMARY

Various embodiments of systems and methods to implement a voice scratchpad for deriving data from a voice communication are provided. The system may include a voice scratchpad module configured to detect an audio connection between an on-board vehicle computing device and a communications device, and present a selector on a voice scratchpad graphical user interface, which upon selection by a user causes the voice scratchpad module to process voice data received via the audio connection to obtain recognized speech data. The system may further include an annotation engine configured to annotate the recognized speech data to produce structured data in one of a plurality of predetermined formats. The voice scratchpad module may be configured to receive the structured data from the annotation engine, and display the structured data on voice scratchpad graphical user interface.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
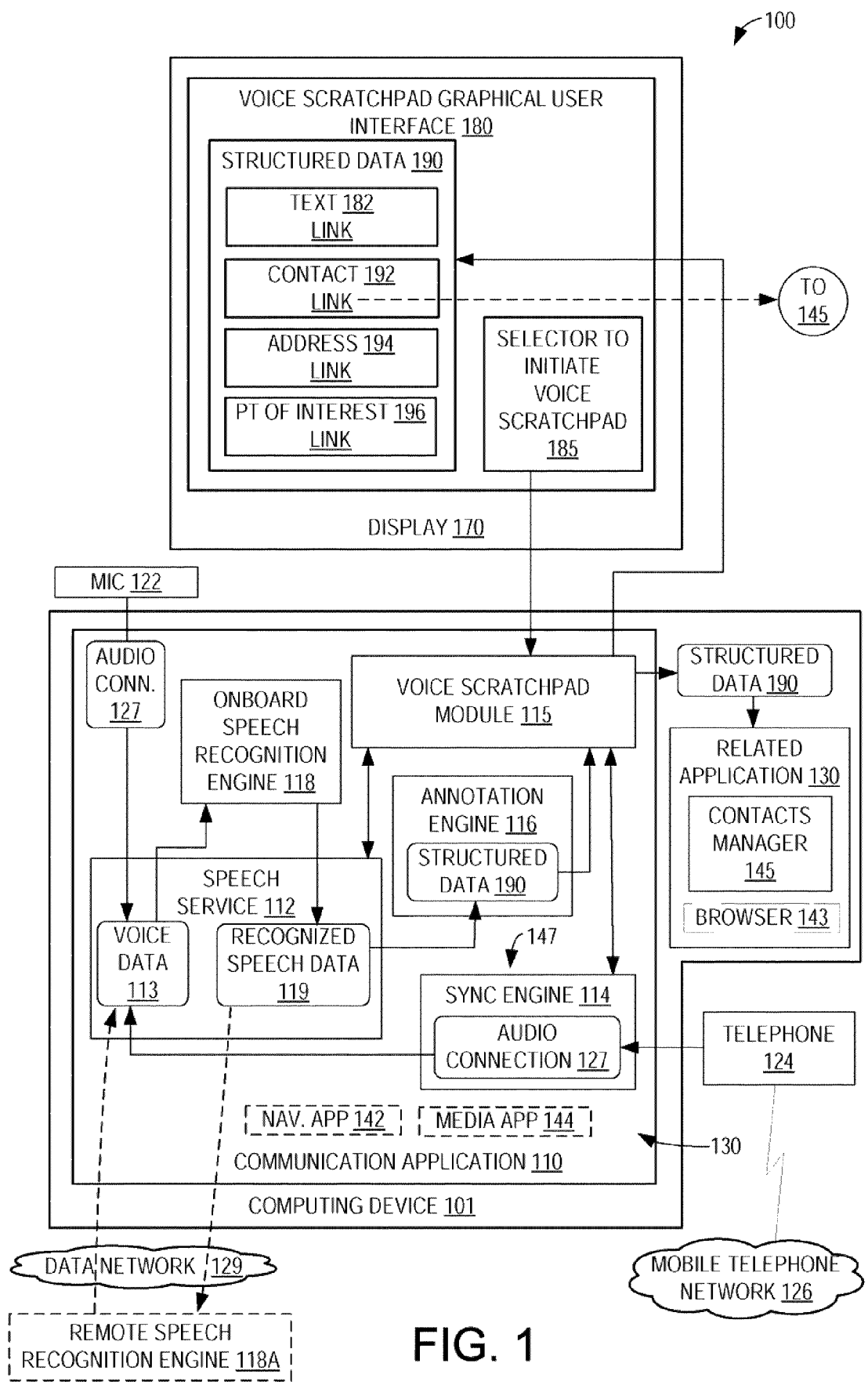
FIG. 1 is a schematic view showing an example embodiment of a computer system for deriving data from a voice communication.

FIG. 1 shows an environment including a computer system 100 having voice scratchpad functionality. The computer system 100 includes a computing device 101 configured to execute a communication application 110 for recording and processing a voice communication, and deriving and displaying structured data 190 representing the content of the voice communication in a voice scratchpad graphical user interface 180 on associated display 170. It will be appreciated that the communication application 110 may be stored in mass storage and executed by a processor using portions of memory of the computing device 101. Further, in some applications it will be understood that computer system 100 may be an onboard communications platform installed in a vehicle, and computing device 101 may be an on-board vehicle computing device.

A user, such as a driver or passenger of the vehicle, may engage in voice communications, for example, by using a communications device, such as a microphone 122 or an onboard mobile telephone 124, that communicates with the communication application 110 via a wired or wireless communications link with the computing device 101. Microphone 122, for example, may be vehicle mounted or wireless headset microphone that is used to input voice commands to the communications application 110, for example. Mobile telephone 124 is typically configured to establish telephone calls with called parties via a mobile telephone network 126. Audio data for these telephone calls may be transmitted from the mobile telephone 124 to the communication application 110 as described below.

The communications application 110 may further include a sync engine 114 that is configured to establish a communications link with the mobile telephone 124, and facilitate the exchange of audio data between the communications application 110 and the mobile telephone 124. This may enable, for example, a hands-free calling session in which audio data from the call is transmitted from the mobile telephone 124 to the communication application 110 via the sync engine 114, and played via in-vehicle speakers, and user voice data is input via microphone 122, and transmitted via the sync engine back to the mobile telephone 124 through the mobile telephone network to the called party, for example. In addition, the sync engine 114 may be used to initiate telephone calls based on commands sent by the communications application to the mobile telephone 124. Thus, the sync engine 114 may function as a part of a telephone program 147 that manages communications between the communication application 110 and the mobile telephone 124.

Communications application 110 includes a voice scratchpad module 115 configured to be executed on the computing device 101. The voice scratchpad module 115 is configured to detect an audio connection 127 between the computing device 101 and a communications device such as the microphone 122 or mobile telephone 124. Detecting the audio connection 127 may include querying and receiving a response from the sync engine 114 that the audio connection 127 is established, or querying and receiving a response from a microphone driver or other software module that is configured to detect the audio connection 127 of the microphone 122. Either prior to or in response to detecting the audio connection 127, the voice scratchpad module 115 is configured to present the voice scratchpad graphical user interface 180 on the display 170 associated with the computing device 101.

As schematically illustrated, the graphical user interface 180 may include a voice scratchpad selector 185, which upon selection by a user causes the voice scratchpad module 115 to record voice data 113 received via the audio connection 127, and process the voice data 113 received via the audio connection 127 to generate recognized speech data. These recording and processing functions may be carried out directly by the voice scratchpad module 115, or indirectly by other program modules under the control of the voice scratchpad module.

The voice data 113 may be received in a variety of formats via a variety of audio connection types. As an example, the voice data 113 received from mobile telephone 124 may be in synchronous-connection-oriented (SCO) audio, while voice data 113 from microphone 122 may be in WAV (WINDOWS® audiovisual) or other file format. In one embodiment, the sync engine 114 may be configured to transcode incoming data from a first format to a second, such as from SCO audio to WAV file format, to facilitate downstream processing. It will be appreciated that these formats are merely exemplary and a wide variety of other formats may be employed.

The voice scratchpad module 115 may be configured to process the voice data 113, for example, by controlling a speech service 112 that is provided within communication application 110 to process the voice data 113 to generate recognized speech data 119. It will be understood that the voice data 113 is in audio form, while the recognized speech data 119 is in text form, such as an ordered set of words organized into phrases and sentences. The speech service 112 may transmit the voice data 113 to a speech recognition engine, which may be an onboard speech recognition engine 118 executed on the computing device 101, or a remote speech recognition engine 118A executed on a remote server and in communication with the computing device 101 via a data network such as the Internet. The speech recognition engine performs the conversion from voice data to recognized speech data and returns recognized speech data 119 to the speech service 112.

Communication application 110 further includes an annotation engine 116 configured to be executed on the computing device 101. The annotation engine is configured to annotate the recognized speech data 119 to produce structured data 190 including one or more of several predefined formats or types of data based on the recognized speech data 119. The predefined formats or types may include text data 182, contact data 192 (including name, phone number email address, and/or physical address, etc.), address data 194 (including a physical address locatable on a map of a region), and point of interest data 196, which indicates a geographic point of interest, such as a business, sightseeing location, public facility, etc. It will be appreciated that these predefined types are merely illustrative and a wide variety of other predetermined formats may be utilized. The structured data may also include links to related applications 130 that may be used to interpret and further utilize the structured data. Alternatively, these links may be programmatically generated by the communication application based on a data type in structured data 190.

Following annotation, the voice scratchpad module 115 is configured to receive the structured data 190 from the annotation engine 116, and display the structured data 190 on voice scratchpad graphical user interface 180, including any appropriate links to related applications 130. The voice scratchpad module may be configured to display in the graphical user interface 180 a link to a related application 130 for each type of data in the structural data, the link being configured upon selection to launch the related application 130 and cause the related application to access the structured data 190. The voice scratchpad module may further be configured to output the structured data for further processing by the related application, either upon or prior to selection of the link. This may be achieved, for example, by storing the structured data in a location on a data store accessible by the related application, for example.

It will be appreciated that the related applications 130 may be internal or external to communication application 110, and for example may include navigation application 142, media application 144, and telephone program 147 which are part of communication application 110, and a browser 143 and contacts manager 145 which are independent of communication application 110, as well as other applications. In this manner, the user may select a link, for example, to input a contact into a local contacts data store using contacts manager 145, map an address or look up information for a point of interest using the navigation application 142, etc.

As discussed in detail with relation to FIG. 3 below, in some embodiments, voice scratchpad module 115 may be configured to store structured data 190 for a plurality of voice data files and display in the graphical user interface a clip management tool with one or more option selectors for managing structured data for a plurality of voice communications. For example, the clip management tool may enable a user to save, delete, display, and send to third parties by email, simple message service (SMS), etc., clips recorded using the voice scratchpad module.

In some embodiments, in response to a selection of the scratchpad selector 185 to initiate the recording and processing of voice data 113 via the voice scratchpad graphical user interface 180, the voice scratchpad module 115 may be configured to provide a notification that voice data is going to be recorded. During a telephone call, the notification may take the form, for example, of an audio announcement played back via the audio connection 127 so that all parties to the telephone call may be notified of the recording as well as a visual notification via the graphical user interface 180, for example. As another example, when a user is taking a notation via the microphone 122, the notification may take the form of an audio announcement played via the speakers of the vehicle, or a visual notification 186 displayed via graphical user interface 180 as shown in FIG. 2.

Figure 2:
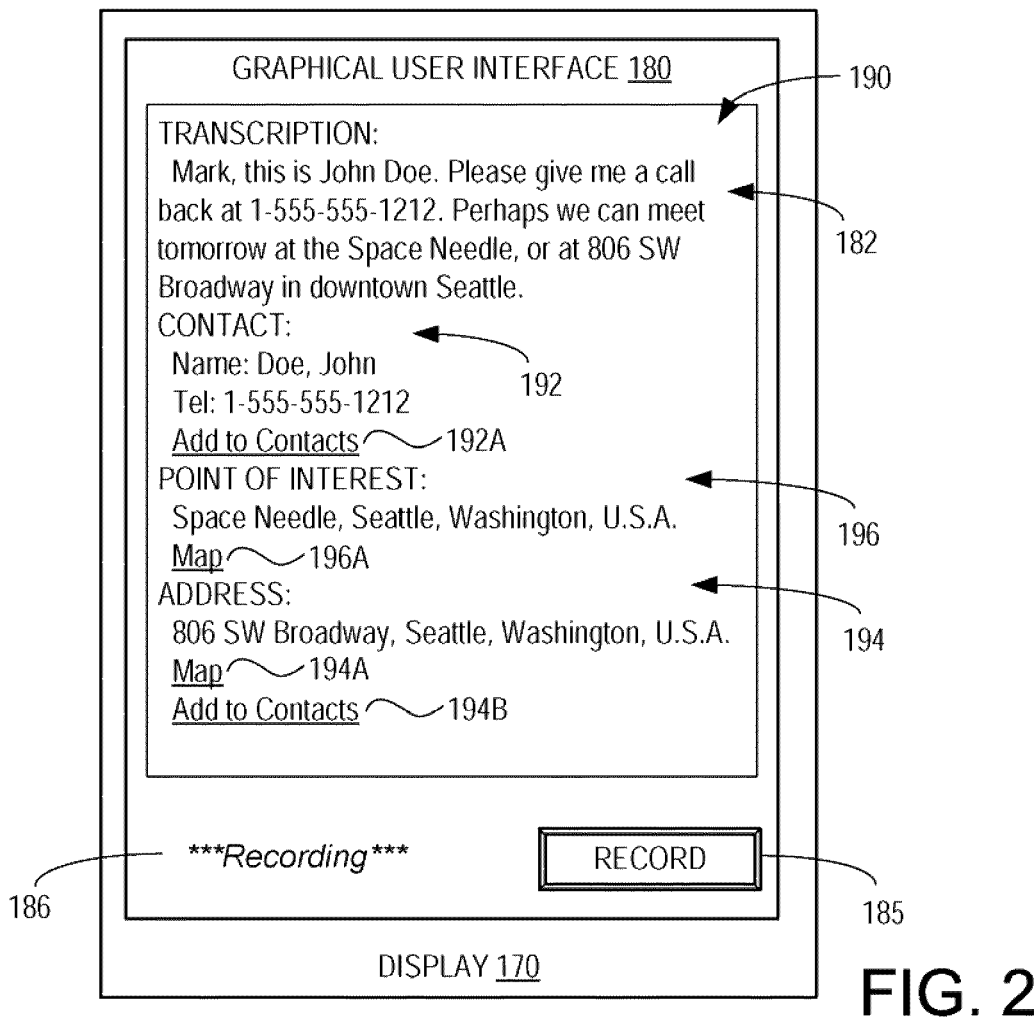
FIG. 2 is a schematic view of a voice scratchpad graphical user interface displayed on a display of the system of FIG. 1.

FIG. 2 illustrates an exemplary embodiment of graphical user interface 180 displayed on display 170. In the illustrated scenario, the record button has been pressed by a user and the voice scratchpad module is recording and transcribing voice data from a detected audio connection from a mobile telephone conversation, hence visual notification 186 is displayed. Structured data 190 derived from the voice data is displayed in a pane in the graphical user interface 180. In the structured data 190, text data 182 is displayed as a transcription of the voice data 113. The annotation engine 116 associated with the voice scratchpad module 115 has identified a contact, John Doe, and his telephone number, 1-555-555-1212, and displays these separate as contact data 192. The annotation engine has included add to contacts link 192A in the contact data 192, the selection of which will launch the contacts manager 145 and pass the contacts data 192 to the contacts manager 145 for further processing.

The annotation engine has also identified a point of interest, the Space Needle, and identified associated information with the point of interest, namely the city, state and country in which the point of interest is located. The annotation engine has further included a navigation application link 196A in point of interest data 196, which if selected launches the navigation application 142 and sends the point of interest data 196 to the navigation application for further processing. The annotation engine has also identified an address in the text data 182, and listed it as address data 194, and further included a plurality of links in the address data 194. Navigation application link 194A causes the navigation application to be launched and display the location of the address contained within address data 194, while selection of the add to contacts link 194B causes the contacts manager 145 to be launched to enable a user to add the address to a local contacts store.

Figure 3:
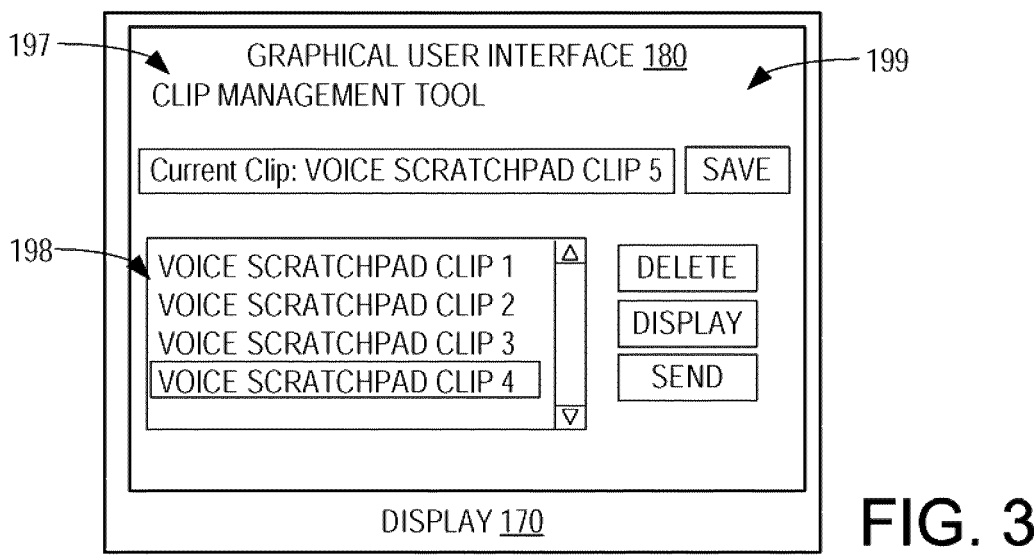
FIG. 3 is a schematic view of a clip management tool displayed on the display of the system of FIG. 1.

As shown in FIG. 3, the voice scratchpad module may be configured to display a clip management tool 197 on the graphical user interface 180. The clip management tool 197 may be configured to display a list 198 including structured data 190 for a plurality of voice communications, referred to as voice scratchpad clips in FIG. 3. The management tool 197 may further be configured to display one or more option selectors 199 for managing the structured data 190 in the list 198. A variety of option selectors 199 may be included, such as a save selector to save a new voice scratchpad clip, a delete selector to remove a voice scratchpad clip from the data store, and a display selector to cause the details of the voice scratchpad clip to be displayed in graphical user interface 180, as illustrated in FIG. 2. The clip management tool 197 may be displayed after the user records a portion of a voice communication using the interface shown in FIG. 2, and thus a name of the current clip may be displayed for editing to the user, as shown. The save selector may be selected by the user to save the current clip to the data store, causing the clip to later appear in the list 198 of stored clips.

Figure 4:
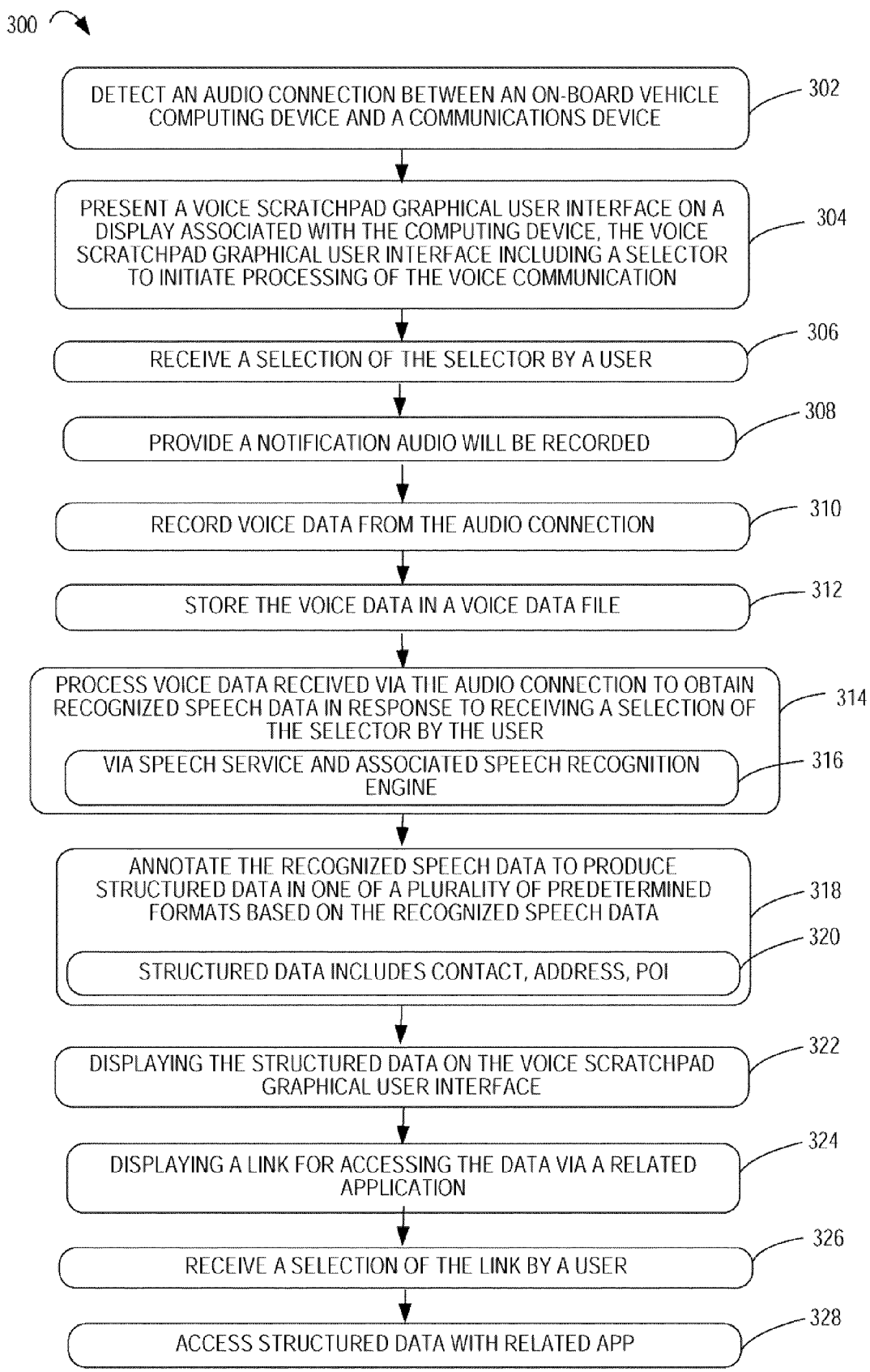
FIG. 4 is a flowchart of an embodiment of a method for deriving data from a voice communication.

FIG. 4 shows a process flow depicting an embodiment of a method 300 for deriving data from a voice communication. As indicated at 302, the method may include detecting an audio connection between an on-board vehicle computing device and a communications device. The communications device may be, for example, a microphone, a mobile telephone, or other communications device.

At 304, the method may include presenting a voice scratchpad graphical user interface on a display associated with the computing device. As described above, the voice scratchpad graphical user interface may include a selector to initiate processing of the voice communication. At 306, the method may include receiving a selection of the selector by a user to initiate voice data processing. At 308, the method may further include providing a notification that audio is going to be recorded, upon receiving a user selection of the selector to initiate processing of voice data. At 310, the method may include recording the audio from the audio connection, and at 312, the method may include storing the voice data received via the audio connection in a data store, which may be a local data store associated with the computing device, or remote data store accessible by the computing device over a data network.

At 314, the method may include processing voice data received via the audio connection to obtain recognized speech data in response to receiving a selection of the selector by the user. As illustrated at 316, processing the voice data may further include controlling a speech service to process the voice data to generate the recognized speech data. As described above, the speech service may be configured to transmit the voice data from the audio connection to a speech recognition engine that is on board the vehicle or remotely connected to the on-board vehicle computing device via a data network for processing, and to receive the recognized speech from the speech recognition engine in response.

At 318, the method may include annotating the recognized speech data to produce structured data in one of a plurality of predetermined formats based on the recognized speech data. As described above, the structured data may include data in one or more predetermined formats or data types, including contact data, address data, or point of interest data, and may also include links to related applications that are configured to access structured data of each data type.

At 322, the method may include displaying the structured data on the voice scratchpad graphical user interface. At 324, the method may further include displaying in the graphical user interface a link for accessing the structured data via a related application. It will be appreciated that the link to the related application may be stored within the structured data itself, and/or may be programmatically generated based on a data type contained within the structured data.

At 326, the method may further include receiving a selection of the link by the user. At 328, the method may further include accessing the structured data with the related application, upon selection of the link by the user. As described above, the related application may be an internal or external application, and may be one or more of a contacts manager, a navigation application, a media application, or a telephone application. In this manner, as illustrated in FIG. 2, a link may be presented to access contact data with a contacts manager program, to send an address to a navigation application, for example, to compute a route to or from the address, to look up information regarding a point of interest with a browser or navigation application, or to initiate a telephone call to a contact telephone number using a telephone program as described above.

In some embodiments the method may include displaying a clip management tool on the graphical user interface. As described above, the clip management tool may be configured to display a list of structured data for a plurality of voice communications, and one or more option selectors for managing the structured data in the list. This may enable the user to conveniently save and later retrieve data from prior voice communications.

The above described systems and methods may be employed to provide a user a convenient mechanism to derive data from a voice communication and use that data with a related application program, for example, when traveling in a vehicle.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, computing devices used in vehicles, mobile computing devices, communications devices coupled with remote computing devices such as a server, etc.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method of deriving data from a voice communication, the method comprising:
   detecting an audio connection between an on-board vehicle computing device and a communications device;
   presenting a voice scratchpad graphical user interface on a display associated with the computing device, the voice scratchpad graphical user interface including a selector to initiate processing of the voice communication;
   receiving a selection of the selector by a user to initiate voice data processing;
   processing voice data received via the audio connection to obtain recognized speech data in response to receiving a selection of the selector by the user;
   annotating the recognized speech data to produce structured data in one of a plurality of predetermined formats based on the recognized speech data, the structured data comprising point of interest data;
   displaying the structured data on the voice scratchpad graphical user interface,
   displaying a clip management tool on the voice scratchpad graphical user interface, the clip management tool being configured to display a list of structured data for a plurality of voice communications, and one or more option selectors for managing the structured data in the list; and
   displaying in the voice scratchpad graphical user interface a navigation application link for accessing the structured data via a navigation application that is configured to launch when the link is selected and to receive the point of interest data from the on-board vehicle computing device for further processing.

2. The method of claim 1, wherein the structured data includes one or more of contact data, address data, or point of interest data.

3. The method of claim 1, further comprising:
   receiving a selection of the link by the user; and
   accessing the structured data with the navigation application.

4. The method of claim 1, the method further comprising providing a notification that audio is going to be recorded, upon receiving the user selection of the selector to initiate processing of voice data.

5. The method of claim 1, wherein the communications device is a microphone or a mobile telephone.

6. The method of claim 1, wherein processing the voice data further includes controlling a speech service to process the voice data to generate the recognized speech data.

7. The method of claim 6, wherein the speech service is configured to transmit the voice data from the audio connection to a speech recognition engine that is onboard a vehicle or remotely connected to the on-board vehicle computing device via a data network for processing, and to receive the recognized speech data from the speech recognition engine in response.

8. A system for deriving data from a voice communication, the system comprising:
   a voice scratchpad module configured to be executed on an on-board vehicle computing device, the voice scratchpad module being configured to detect an audio connection between the on-board vehicle computing device and a communications device, the voice scratchpad module further being configured to present a voice scratchpad graphical user interface on a display associated with the computing device, the graphical user interface including a selector, which upon selection by a user causes the voice scratchpad module to process voice data received via the audio connection to obtain recognized speech data; and
   an annotation engine configured to be executed on the on-board vehicle computing device, the annotation engine being configured to annotate the recognized speech data to produce structured data in one of a plurality of predetermined formats based on the recognized speech data,
   wherein the voice scratchpad module is configured to receive the structured data from the annotation engine, and display the structured data on the voice scratchpad graphical user interface, the voice scratchpad module further configured to display a clip management tool on the voice scratchpad graphical user interface, the clip management tool being configured to display a list of structured data for a plurality of voice communications, and one or more option selectors for managing the structured data in the list;
   wherein the voice scratchpad module is further configured to display in the voice scratchpad graphical user interface a link to a related application for each type of data in the structured data, the link being configured to launch the related application upon selection, the voice scratchpad module further being configured to output the structured data for further processing by the related application, wherein the related application comprises a navigation application, the structured data comprises point of interest data, and the navigation application is configured to:
   launch when the link for the navigation application is selected, and
   receive the point of interest data from the on-board vehicle computing device for further processing.

9. The system of claim 8, wherein the structured data includes a plurality of different data types, including text data, contact data, address data, and/or point of interest data.

10. The system of claim 8, wherein in response to a selection of the selector for initiating a voice scratchpad, the voice scratchpad module is configured to provide a notification that voice data is going to be recorded.

11. The system of claim 8, wherein the communications device is a microphone or a mobile telephone.

12. The system of claim 8, wherein the voice scratchpad module is configured to process the voice data by controlling a speech service to process the voice data to generate the recognized speech data.

13. The system of claim 12, wherein the speech service is configured to transmit the voice data from the audio connection to a speech recognition engine that is either onboard a vehicle or remotely connected to the on-board vehicle computing device via a data network, and receive the recognized speech from the speech recognition engine in response.

14. A method of deriving data from a voice communication, the method comprising:
   detecting an audio connection between an on-board vehicle computing device and a communications device, wherein the communications device is a microphone or a mobile telephone;
   presenting a voice scratchpad graphical user interface on a display associated with the computing device, the voice scratchpad graphical user interface including a selector to initiate processing of the voice communication;
   receiving a selection of the selector by a user to initiate voice data processing;

processing voice data received via the audio connection to obtain recognized speech data in response to receiving a selection of the selector by the user;

annotating the recognized speech data to produce structured data in one of a plurality of predetermined formats based on the recognized speech data;

displaying the structured data on the voice scratchpad graphical user interface;

displaying in the voice scratchpad graphical user interface a link for accessing the structured data via a related application; and displaying a clip management tool on the voice scratchpad graphical user interface, the clip management tool being configured to display a list of structured data for a plurality of voice communications, and one or more option selectors for managing the structured data in the list, wherein the predetermined format of the structured data includes point of interest data, and the related application comprises a navigation application that is configured to launch when the link is selected and to receive the point of interest data from the on-board vehicle computing device for further processing.

15. The method of claim 1, wherein displaying the clip management tool comprises displaying the clip management tool after the user records a portion of a voice communication.

16. The method of claim 15, further comprising displaying a name of a current clip for editing.

17. The system of claim 8, wherein the voice scratchpad module is further configured to display the clip management tool after the user records a portion of a voice communication.

18. The system of claim 17, wherein the voice scratchpad module is further configured to display a name of a current clip for editing.

19. The method of claim 14, wherein displaying the clip management tool comprises displaying the clip management tool after the user records a portion of a voice communication.

20. The method of claim 19, further comprising displaying a name of a current clip for editing.

* * * * *